No. 886,224. PATENTED APR. 28, 1908.
R. LAUFER.
MEASURING DEVICE.
APPLICATION FILED DEC. 4, 1907.

2 SHEETS—SHEET 1.

Witnesses
F. C. Gibson.
C. Bradway.

Inventor
Robert Laufer.

By Victor J. Evans
Attorney

No. 886,224.
PATENTED APR. 28, 1908.
R. LAUFER.
MEASURING DEVICE.
APPLICATION FILED DEC. 4, 1907.
2 SHEETS—SHEET 2.
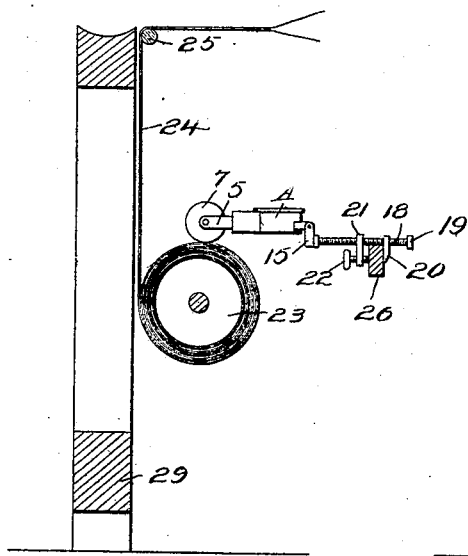
Fig. 9.
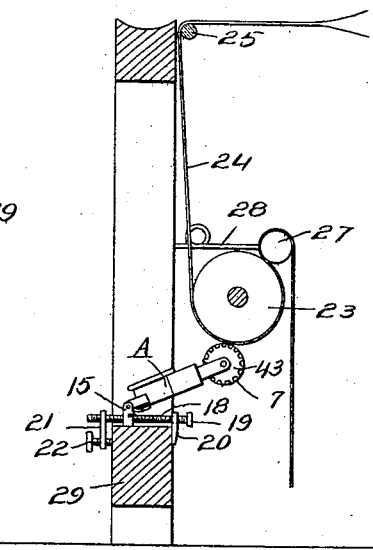
Fig. 10.
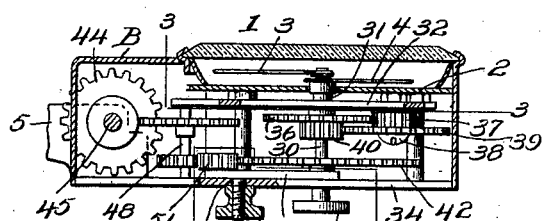
Fig. 4.
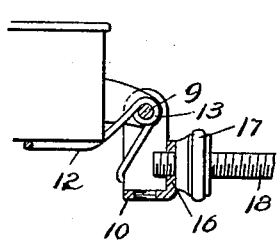
Fig. 8.
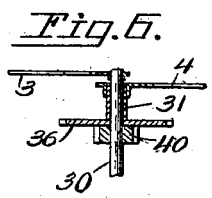
Fig. 6.
Fig. 7.
Witnesses
F. C. Gibson.
C. Bradway
Inventor
Robert Laufer.
By Victor J. Evans
Attorney

UNITED STATES PATENT OFFICE.

ROBERT LAUFER, OF EAST GREENVILLE, PENNSYLVANIA, ASSIGNOR OF ONE-HALF TO CHARLES L. HUBER, OF EAST GREENVILLE, PENNSYLVANIA.

MEASURING DEVICE.

No. 886,224.

Specification of Letters Patent.

Patented April 28, 1908.

Application filed December 4, 1907. Serial No. 405,076.

*To all whom it may concern:*

Be it known that I, ROBERT LAUFER, a citizen of the United States, residing at East Greenville, in the county of Montgomery and State of Pennsylvania, have invented new and useful Improvements in Measuring Devices, of which the following is a specification.

This invention relates to a measuring device intended primarily for use in connection with looms for measuring, in yards or other suitable units, the ribbon, cloth or other fabric produced by the loom, and while being particularly useful in this relation, it is to be understood that the invention is suitable for other uses.

The invention has for one of its objects to improve and simplify the construction and operation of measuring apparatus of this character so as to be comparatively easy and inexpensive to manufacture, efficient in use, and possessing great durability.

A further object of the invention is the provision of a simple and improved mounting for the device whereby it can be applied to a loom in different positions, according to the requirements of the given case, the device being in the nature of an attachment whereby it can be placed over or under the guide roll on which the ribbon or other fabric runs.

Another object of the invention is to provide a measuring device including means for enabling the hands of the indicating mechanism to rotate in the proper direction irrespective of the direction of rotation of the contact roller of the device, so that the guide roll of the loom over which the ribbon passes can rotate in either direction.

With these and other objects in view, as will appear as the description proceeds, the invention comprises the various novel features of construction and arrangement of parts which will be more fully described hereinafter and set forth with particularity in the claims appended hereto.

Figure 1:
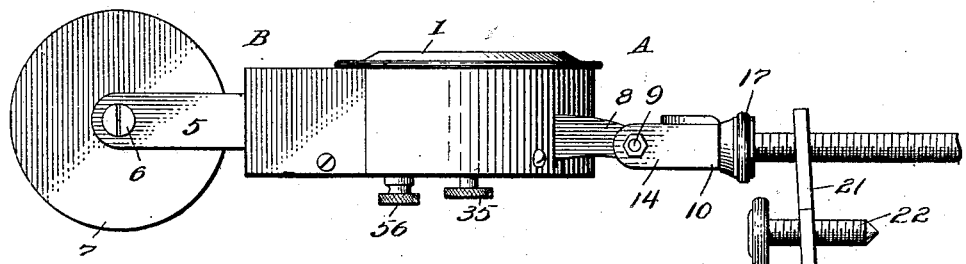
Figure 2:
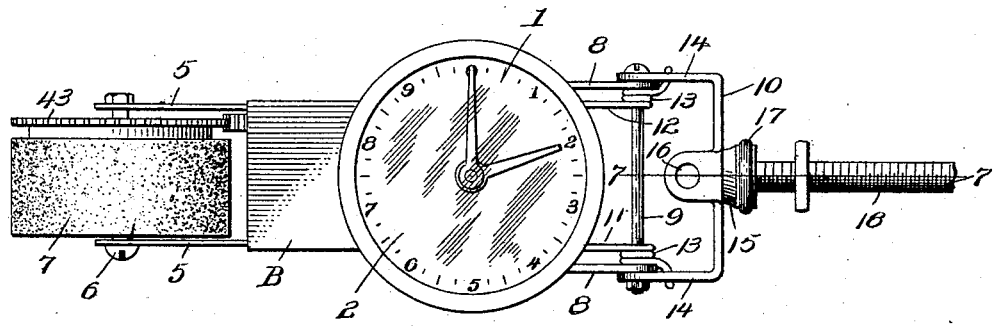
Figure 3:
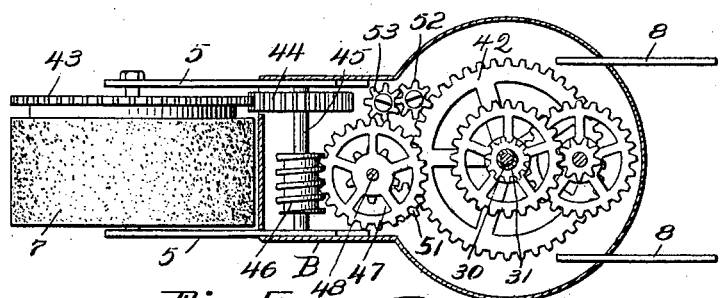
Figure 5:
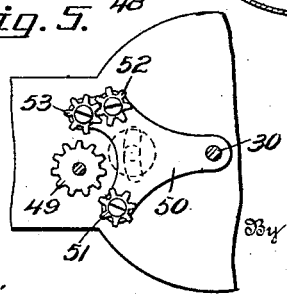

In the accompanying drawings, which illustrate one of the embodiments of the invention, Figure 1 is a side view of the measuring device. Fig. 2 is a plan view thereof. Fig. 3 is a horizontal section on line 3—3 Fig. 4, with parts in elevation. Fig. 4 is a vertical section through the casing of the device. Fig. 5 is a fragmentary sectional view on line 5—5, Fig. 4, with parts in elevation. Fig. 6 is a fragmentary sectional view showing the hand-carrying arbor of the indicating mechanism and attached parts. Fig. 7 is a sectional view on line 7—7, Fig. 2. Fig. 8 is a similar view showing the parts in a different position. Figs. 9 and 10 are views illustrating two different ways of using the device on a loom.

Similar reference characters are employed to designate corresponding parts throughout the several views.

Referring to the drawings, A designates the casing of the device which is provided at its top with a glass or other transparent face 1 through which is exposed a suitably graduated dial 2, and the hands 3 and 4. Extending from one side and connected with the casing is a tubular extension B from which project parallel arms 5 that are apertured for receiving the bolt 6 that forms the axle of the contact wheel or roller 7, which is adapted to bear against the ribbon or other fabric to be measured, or to bear against a roll over which the ribbon passes. From the side of the casing opposite to the extension B extend arms 8 that are apertured to receive the bolts 9 which contitutes a pintle for connecting the arms with the yoke 10 of the supporting structure or mounting of the device. For yieldingly holding the contact wheel 7 in engagement with the ribbon or guide roll therefor, a spring 11 is arranged between the yoke 10 and casing of the device, the spring in the present instance consisting of a U-shaped portion 12 disposed under the casing with its extremities coiled at 13 around the pintle and its terminals bent under the ears 14 of the yoke, the torsional effect of the coils 13 serving to urge the casing A and attached parts upwardly. The yoke is provided with vertical and horizontal threaded openings 15 and 16, and screwing into either one of these openings, according to the manner in which the device is to be applied to the loom, is a clamping rod 18.

As shown in Figs. 9 and 10, the threaded rod 18 has a head 19 which may be gripped in the hand or by a suitable device for turning the rod to clamp the device in position. On the rod 18 is a clamping jaw 20 which cooperates with a second clamping jaw 21 to firmly secure the device to a suitable part of the frame of the loom. On the jaw 21 is a screw 22 for tightening or loosening the grip of the jaws.

In Fig. 9, the measuring device is mounted on the loom in such a position that the contact wheel 7 bears upon the guide roll 23 over which the ribbon or other fabric 24 passes before being wound into a bolt. C designates a portion of the frame of the loom on which the roll 23 is supported and the ribbon is guided to the roll over the glass shaft or roll 25. The mounting for the casing A is clamped to a cross-bar 26 of the loom at a point in front of the roll 23, and the spring 11 is removed so that the weight of the casing A and attached parts will be sufficient to maintain the wheel 7 in proper relation with the roll 23.

When the device is used as shown in Fig. 9, the extremity of the screw 18 is screwed into the opening 16, as shown in Fig. 8, and the yoke is firmly held in position by the clamping nut 17 of the screw being jammed against the said head. The jaws 20 and 21 are then adjusted so as to embrace the bar 26 and the screw 22 is then turned in a direction to engage the bar 26 on one side, while the jaw 20 engages it at the opposite side. Instead of engaging the screw in the opening 16, as shown in Figs. 8 and 9, it can be engaged in the opening 15, as shown in Fig. 7, and when in this latter position, the spring 12 is not under as great a tension as when the parts are in the position shown in the first-mentioned figures.

In Fig. 10, the ribbon 24 is run approximately two-thirds around the roll 23 and thence over a coöperating guide roll 27 supported on a pair of spring members 28 that urge the roll 27 toward the roll 23, one of such members being shown in the figure. The measuring device is mounted on the frame of the loom in a position under the guide roll 23 and the wheel 7 is held in contact with the latter by reason of the spring 11. The mounting for the casing A is clamped to the horizontal beam 29 of the loom frame. The jaw 20 engages one side of the beam 29 and the screw 22 binds against the opposite side, with the rod 18 disposed over the beam in such position that the head 15 bears on the top surface of the beam. It will thus be seen that as the ribbon is drawn over the roll 23, the wheel 7 will be rotated and caused to actuate the indicating mechanism of the measuring device.

With the device in the position shown in Fig. 10, the yoke 18 is adjacent the middle of the screw so that the yoke will bear on the top of the beam 29 and the clamping jaws 20 and 21 are disposed at opposite sides of the said yoke so as to engage the front and rear sides of the beam. When the jaws are adjusted to just engage the beam, the clamping screw 22 is tightened so as to firmly hold the device in position.

The hands 3 and 4 are mounted respectively on the arbor 30 and sleeve 31. The sleeve surrounds the arbor and rotates in the supporting plate 32 that has an aperture 33 forming a bearing for the sleeve. This sleeve constitutes a bearing for one end of the arbor, while the opposite end passes through the bottom plate 34, there being a finger wheel 35 on the outer end of the arbor for permitting the hands to be returned to zero position. On the arbor is loosely mounted a gear wheel 36 that meshes with a pinion 37 on the pivot 38 secured to the plate 32, and connected with the pinion 37 is a gear wheel 39 that meshes with a pinion 40 on the arbor. These pinions and gears constitute a speed-reducing mechanism whereby the rotation of the arbor 30 will cause the hand 4 to turn one unit while the hand 3 makes a complete revolution, it being understood that the sleeve 30 to which the hand 4 is attached is rigidly connected with the gear wheel 36. Interposed between the plate 32 and gear wheel 36 is a spacing washer 41, and on the lower end of the arbor is a large gear wheel 42 which receives motion from the contact wheel 7 through a suitable mechanism.

Secured to the contact wheel 7 is a toothed wheel 43 that meshes with a smaller toothed wheel 44 on the horizontal worm-carrying shaft 45 that is disposed within the extension B of the casing. On the shaft 45 is a worm 46 that meshes with a worm wheel 47 on the vertical shaft 48, and on the lower end of this latter shaft is a gear 49 which transmits motion to the large gear wheel 42 through a reversing mechanism. This mechanism comprises an oscillatory plate 50, Fig. 5, that pivots on the arbor 30 at the lower end thereof, and on this plate are pinions 51 and 52 permanently in mesh with the wheel 42, the pinions being so arranged that when the pinion 51 is in mesh with the gear wheel 49, the arbor will be turned in one direction, and turned in the opposite direction when the pinion 52 is driven by the pinion 53 by being thrown into mesh with the gear wheel 49, the pinion 53 being mounted on the plate 50 and arranged permanently in mesh with the pinion 52. On the plate 50 is a downwardly-extending threaded stud 54 that passes through a slot 55 in the bottom plate 34 of the casing, and on the stud is a clamping nut 56 which is adapted to be screwed home against the bottom plate 34 so as to clamp the oscillatory plate 50 in fixed position on the top of the bottom plate so as to hold either the pinion 51 or 53 in mesh with the gear wheel 49. By providing this reversing mechanism, the measuring device can be adjusted for operating in connection with a guide roll for the ribbon, irrespective of whether the said guide roll rotates in a clockwise or anti-clockwise direction, it being understood that the arbor must rotate only in one direction.

In practice, the measuring device is adjusted in position, as before explained, so that the contact wheel 7 will be in engagement with the cloth to be measured. The movement of the cloth causes the contact wheel to rotate, and the gear wheels 43 and 44 transmit motion from the contact wheel to the worm shaft 45. The worm 46 in turn rotates the shaft 48 by the worm wheel 47 meshing with the said worm and the gear 49 on the shaft 48, by meshing with either pinion 51 or 53, transmits motion to the wheel 42 on the hand-carrying shaft or arbor 30. As the shaft 30 is turned, the quick-moving hand 3 turns with it, and by means of the intermeshing pinion 40 and gear wheel 39, and the intermeshing pinion 37 and gear wheel 36, the sleeve 31 carrying the slow-moving hand 4 is turned so that by the position of the hands with respect to the dial, the number of yards of cloth can be readily ascertained.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:—

1. The combination of a measuring device including a contact element with a mounting for the device comprising a member hingedly connected with the device and provided with a threaded opening, a threaded rod screwed into the opening, a pair of clamping jaws removably threaded on the rod, a screw carried by one of the jaws and coöperating with the other jaw to secure the device to a support, and a spring arranged to operate between the member and device for holding the latter in operative position.

2. The combination of a contact element, a support on which the element is rotatably mounted, a gear wheel secured to the element to rotate therewith, a worm shaft, a pinion on the shaft meshing with the said gear wheel, a second shaft, a worm wheel on the second shaft, an indicating mechanism, an adjustable means between the mechanism and the second shaft for actuating the mechanism in one direction by the rotation of the second shaft in either direction.

3. The combination of a measuring device including a contact element, with a mounting therefor comprising a threaded rod, a pair of independently adjustable clamping jaws threaded on the rod, a clamping screw on one of the jaws, and a pivotal connection between the rod and measuring device.

4. The combination of a measuring device, with a mounting therefor, said mounting comprising a yoke, a pintle hingedly connecting the device with the yoke, a spring arranged on the pintle to act on the yoke and device to constantly urge the latter in a definite direction, a head on the yoke having right-angularly disposed threaded openings, a member designed to engage in either of the openings, and clamping devices on the member.

5. In a measuring device, the combination of an indicating mechanism, a support therefor, a rotary contact element on the support, and means between the mechanism and element for permitting the latter to rotate in either direction with the same effect on the mechanism, said means comprising a gear wheel driven by the element, a gear wheel for driving the mechanism, an oscillatory member, a pair of pinions on the member permanently in mesh with the second gear wheel and arranged to permit one of the pinions to be thrown into mesh with the first-mentioned gear wheel, and a pinion permanently meshing with the other of the two pinions and adapted to be thrown into mesh with the first-mentioned gear wheel.

6. In a measuring device, the combination of a casing having an arcuate slot in one of its walls, a dial in the casing, hands disposed over the dial, an arbor to which one of the hands is connected, means for driving the other hand from the arbor at a reduced speed, a gear wheel on the arbor, a plate pivoted on the arbor and adapted to be clamped against the slotted wall, a stud on the plate passing through the slot, a nut on the stud for clamping the plate in fixed position, a shaft, a gear wheel on the shaft, pinions on the plate arranged in mesh with the gear wheel on the arbor, and one of the pinions being adapted to be thrown into mesh with the gear wheel on the said shaft, a second pinion on the plate meshing with the other pinion and adapted to be thrown into mesh with the gear wheel on the shaft, a contact wheel rotated by the article to be measured, and means between the contact wheel and shaft for rotating the latter.

In testimony whereof I affix my signature in presence of two witnesses.

ROBERT LAUFER.

Witnesses:
   ROBERT G. GREGG, Jr.,
   HOWARD G. CHRISTMAN.